United States Patent
Shelby et al.

(10) Patent No.: US 8,986,591 B2
(45) Date of Patent: Mar. 24, 2015

(54) VOID-CONTAINING POLYESTER SHRINK FILM WITH IMPROVED DENSITY RETENTION

(75) Inventors: Marcus David Shelby, Fall Branch, TN (US); Candace Michele Tanner, Kingsport, TN (US); Mark Elliott Tincher, Kingsport, TN (US); Rondell Paul Little, Jr., Elizabethton, TN (US)

(73) Assignee: Eastman Chemical Company, Kingsport, TN (US)

( * ) Notice: Subject to any disclaimer, the term of this patent is extended or adjusted under 35 U.S.C. 154(b) by 1117 days.

(21) Appl. No.: 12/851,717

(22) Filed: Aug. 6, 2010

(65) Prior Publication Data

US 2010/0295200 A1    Nov. 25, 2010

Related U.S. Application Data

(62) Division of application No. 10/905,532, filed on Jan. 9, 2005, now abandoned.

(60) Provisional application No. 60/633,765, filed on Dec. 7, 2004.

(51) Int. Cl.
| | |
|---|---|
| *B29C 55/00* | (2006.01) |
| *B29C 67/20* | (2006.01) |
| *C08J 5/18* | (2006.01) |
| *B29C 47/00* | (2006.01) |
| *C08L 67/02* | (2006.01) |
| *B32B 5/18* | (2006.01) |
| *C08K 3/00* | (2006.01) |
| *C08L 101/00* | (2006.01) |

(52) U.S. Cl.
CPC ............. *B29C 67/20* (2013.01); *B29C 47/0057* (2013.01); *B29C 55/005* (2013.01); *C08J 5/18* (2013.01); *C08J 2367/02* (2013.01); *C08K 3/00* (2013.01); *C08L 67/02* (2013.01); *C08L 101/00* (2013.01)
USPC ........ 264/320; 264/48; 264/210.2; 264/210.7

(58) Field of Classification Search
USPC ............................... 264/48, 210.2, 210.7, 320
See application file for complete search history.

(56) References Cited

U.S. PATENT DOCUMENTS

| | | |
|---|---|---|
| 3,426,754 A | 2/1969 | Bierenbaum et al. |
| 3,562,200 A | 2/1971 | Jones et al. |
| 3,579,608 A | 5/1971 | De Coste |
| 3,579,609 A | 5/1971 | Sevenich |
| 3,585,255 A | 6/1971 | Sevenich |
| 3,849,530 A | 11/1974 | Wyeth et al. |
| 3,944,699 A | 3/1976 | Mathews et al. |
| 4,020,141 A | 4/1977 | Quinn et al. |
| 4,138,459 A | 2/1979 | Brazinsky et al. |
| 4,318,950 A | 3/1982 | Takashi et al. |
| 4,582,752 A | 4/1986 | Duncan |
| 4,632,869 A | 12/1986 | Park et al. |
| 4,770,931 A | 9/1988 | Pollock et al. |
| 4,771,108 A | 9/1988 | Mackensie |
| 4,814,426 A | 3/1989 | Utsumi et al. |
| 4,871,784 A | 10/1989 | Otonari et al. |
| 4,939,232 A | 7/1990 | Fukuda et al. |
| 4,942,005 A | 7/1990 | Pollock et al. |
| 4,963,418 A | 10/1990 | Isaka et al. |
| 4,965,123 A | 10/1990 | Swan et al. |
| 4,990,401 A | 2/1991 | Renalls |
| 5,070,180 A | 12/1991 | Fukuda et al. |
| 5,084,334 A | 1/1992 | Hamano et al. |
| 5,091,236 A | 2/1992 | Keller et al. |
| 5,156,905 A | 10/1992 | Bagrodia et al. |
| 5,176,954 A | 1/1993 | Keller et al. |
| 5,275,854 A | 1/1994 | Maier et al. |
| 5,290,631 A | 3/1994 | Fleury et al. |
| 5,354,595 A | 10/1994 | Yamamoto et al. |
| 5,403,897 A | 4/1995 | Ebato et al. |
| 5,422,175 A | 6/1995 | Ito et al. |
| 5,435,955 A | 7/1995 | Kamei et al. |
| 5,811,493 A | 9/1998 | Kent |
| 5,824,398 A | 10/1998 | Shih |
| 5,843,578 A | 12/1998 | Sasaki et al. |
| 5,888,650 A | 3/1999 | Calhoun et al. |
| 6,004,664 A | 12/1999 | Sasaki et al. |

(Continued)

FOREIGN PATENT DOCUMENTS

| | | |
|---|---|---|
| EP | 0 044 616 A1 | 1/1982 |
| EP | 0 194 058 A2 | 9/1986 |

(Continued)

OTHER PUBLICATIONS

Derwent Abstract 1993-002710.
Derwent Abstract 2002-123291.
Derwent Abstract 2002-207165.
Derwent Abstract 2002-330958.
Derwent Abstract 2002-330959.
Shih, *Poly.Eng.Sci.*, 34, 1121 (1994).
Wu, Souheng, *Polymer Handbook*, Edited by Brandrup et al, John Wiley & Sons, (1989) pp. 411-434.
W.C. Young, Roark's Formulas for Stress and Strain, 6th Edition, McGraw-Hill, New York, p. 689 (1989).
Adhesives for Low Energy Surfaces, Nov. 11, 2002, 3 pages, http://www.specialchem4adhesives.com/home/editorial.aspx?id=149&ttr=lowsurface.

(Continued)

*Primary Examiner* — Atul P. Khare
(74) *Attorney, Agent, or Firm* — Eric D. Middlemas; Louis N. Moreno

(57) ABSTRACT

Disclosed are void-containing polyester shrink films which show excellent density retention upon exposures to high temperatures. The films have high shrinkage and retain their low density after processing under conditions of temperature and moisture used in typical recycling processes. The films are useful for sleeve label and other shrink film applications, and their lower density allows them to be readily separated from soft drink bottles, food containers and the like during recycling operations. Also disclosed is a process for void-containing polyester shrink films having high shrinkage and low density after exposure to elevated temperatures.

19 Claims, No Drawings

(56) References Cited

U.S. PATENT DOCUMENTS

| | | | |
|---|---|---|---|
| 6,054,209 | A | 4/2000 | Imanishi et al. |
| 6,177,181 | B1 | 1/2001 | Hamada et al. |
| 6,228,313 | B1 | 5/2001 | Miki |
| 6,287,680 | B1 | 9/2001 | Sasaki et al. |
| 6,348,258 | B1 | 2/2002 | Topolkaraev et al. |
| 6,362,306 | B1 | 3/2002 | Shelby et al. |
| 6,458,437 | B1 | 10/2002 | Ito et al. |
| 6,500,533 | B1 | 12/2002 | Kong et al. |
| 6,627,695 | B2 | 9/2003 | Murschall et al. |
| 6,635,340 | B2 | 10/2003 | Murschall et al. |
| 6,720,085 | B2 | 4/2004 | Ito et al. |
| 6,863,939 | B2 | 3/2005 | Laney et al. |
| 6,867,168 | B2 | 3/2005 | Laney et al. |
| 6,893,706 | B2 | 5/2005 | Peiffer et al. |
| 7,030,181 | B2 | 4/2006 | Moskala et al. |
| 7,273,894 | B2 | 9/2007 | Shelby et al. |
| 7,285,587 | B2 | 10/2007 | Strand et al. |
| 7,303,812 | B2 | 12/2007 | Hashimoto et al. |
| 7,749,584 | B2 | 7/2010 | Hayakawa et al. |
| 7,900,054 | B2 | 3/2011 | Peiffer et al. |
| 2001/0036545 | A1 | 11/2001 | Nishi et al. |
| 2003/0068453 | A1 | 4/2003 | Kong |
| 2003/0104193 | A1 | 6/2003 | Martin et al. |
| 2003/0170427 | A1 | 9/2003 | Ito et al. |
| 2004/0185198 | A1 | 9/2004 | Sisson et al. |
| 2004/0232563 | A1 | 11/2004 | Sumi et al. |
| 2005/0118406 | A1 | 6/2005 | Shelby et al. |
| 2005/0119359 | A1 | 6/2005 | Shelby et al. |
| 2006/0121219 | A1 | 6/2006 | Shelby et al. |
| 2007/0004813 | A1 | 1/2007 | Shelby et al. |
| 2009/0227735 | A1 | 9/2009 | Shih et al. |

FOREIGN PATENT DOCUMENTS

| | | |
|---|---|---|
| EP | 0 203 739 A1 | 12/1986 |
| EP | 0 214 859 A2 | 3/1987 |
| EP | 0 522 758 | 1/1993 |
| EP | 0 581 970 B1 | 8/1998 |
| EP | 1 304 219 A1 | 4/2003 |
| EP | 1 340 609 A2 | 9/2003 |
| EP | 1 340 785 A2 | 9/2003 |
| EP | 1 391 288 | 2/2004 |
| EP | 1 418 042 | 5/2004 |
| EP | 1 431 055 A2 | 6/2004 |
| EP | 1 491 576 | 12/2004 |
| EP | 1 661 936 | 5/2006 |
| GB | 2 393 418 A | 3/2004 |
| JP | 53-27307 B | 8/1978 |
| JP | 57059618 | 10/1982 |
| JP | 61-037827 A | 2/1986 |
| JP | 63-193822 A | 8/1988 |
| JP | 3-178421 A | 8/1991 |
| JP | 4-153233 A | 5/1992 |
| JP | 5-104630 A | 4/1993 |
| JP | 5-194773 A | 8/1993 |
| JP | 5-245930 | 9/1993 |
| JP | 5-279494 A | 10/1993 |
| JP | 5-345398 A | 12/1993 |
| JP | 6-166133 A | 6/1994 |
| JP | 6-271747 | 9/1994 |
| JP | 7-53756 A | 2/1995 |
| JP | H1036651 A | 2/1998 |
| JP | 11-12377 A | 1/1999 |
| JP | 11-263854 A | 9/1999 |
| JP | 2000-17093 A | 1/2000 |
| JP | 2000-290356 A | 10/2000 |
| JP | 3139533 B2 | 12/2000 |
| JP | 2001-71441 A | 3/2001 |
| JP | 2001-219519 A | 8/2001 |
| JP | 2001-301023 A | 10/2001 |
| JP | 2002-60531 A | 2/2002 |
| JP | 2003-159773 A | 6/2002 |
| JP | 2002-278460 A | 9/2002 |
| JP | 2003-154619 A | 5/2003 |
| JP | 2003-267437 A | 9/2003 |
| JP | 2003-292592 A | 10/2003 |
| JP | 2003-340922 A | 12/2003 |
| JP | 2004-181863 A | 7/2004 |
| JP | 2004-209905 A | 7/2004 |
| WO | WO 95/14734 | 6/1995 |
| WO | WO 99/62982 | 12/1999 |
| WO | WO 00/69962 A1 | 11/2000 |
| WO | WO 01/12697 | 2/2001 |
| WO | WO 01/58684 A1 | 8/2001 |
| WO | WO 03/013833 A | 2/2003 |
| WO | WO 03/029002 A1 | 4/2003 |
| WO | WO 2005/061596 A1 | 7/2005 |
| WO | WO 2005/061628 | 7/2005 |

OTHER PUBLICATIONS

E. R. Dixon, J. B. Jackson, "The Inter-Relation of Some Mechanical Properties with Molecular Weight and Crystallinity in Poly(ethylene terephthalate)," Journal of Material Science, 3 (1968), pp. 464-470.
"Glass Transition Temperature" May 7, 2007, 6 pages.
PCT International Search Report and Written Opinion for PCT/US2004/038591 dated Apr. 18, 2005.
PCT International Search Report and Written Opinion for PCT/US2004/038592 dated Apr. 18, 2005.
PCT International Search Report and Written Opinion for PCT/US2005/042469 dated May 19, 2006.
PCT International Search Report for International Application PCT/US2009/001441 dated Jun. 26, 2009.
USPTO Co-pending U.S. Appl. No. 12/397,624, filed Mar. 4, 2009.
USPTO Office Action dated Aug. 4, 2011 for U.S. Appl. No. 12/397,624.
USPTO Office Action dated Dec. 30, 2011 for U.S. Appl. No. 12/397,624.
International Search Report for International Application PCT/US2009/001441 dated Jun. 26, 2009.
Copending U.S. Appl. No. 13/172,080, filed Dec. 12, 2012.
USPTO Office Action dated Jul. 15, 2013 received in copending U.S. Appl. No. 13/712,080.
USPTO Office Action dated Feb. 27, 2014 in copending U.S. Appl. No. 13/712,080.
Notification of Transmittal of The International Search Report and Written Opinion of the International Searching Authority, or the Declaration—International Application No. PCT/US2013/072551 with a mailing date of Mar. 4, 2014.

VOID-CONTAINING POLYESTER SHRINK FILM WITH IMPROVED DENSITY RETENTION

CROSS REFERENCES TO RELATED APPLICATIONS

This application is a divisional application of U.S. patent application Ser. No. 10/905,532, filed Jan. 9, 2005, which claims the benefit of U.S. Provisional Application Ser. No. 60/633,765, filed Dec. 7, 2004.

FIELD OF THE INVENTION

This invention pertains to void-containing, polyester shrink films. More particularly, this invention pertains to void-containing, polyester shrink films that have high shrinkage and maintain a low density after shrinkage. The invention further pertains to a process for a void-containing shrink film that has high shrinkage and good density retention after shrinkage. The films may be used to produce labels for packaging applications.

BACKGROUND OF THE INVENTION

Films produced from polymers such as polyolefins, polystyrene, poly(vinyl chloride), polyesters and the like, are used frequently for the manufacture of labels for plastic beverage or food containers. Because these labels are often recycled, it is desirable that the label materials are compatible with the recycling process streams and not cause excessive contamination of those streams. For example, in most recycling operations, the bottle or container is the primary object of recycle while the label, because of its printing inks and glues, generally is considered a "contaminant". As a result, the label is usually isolated and removed. For example, poly(ethylene terephthalate) ("PET") bottles typically use non-shrinking, roll-fed polypropylene ("PP") labels. In a typical recycling operation, the PET bottle polymer is collected and cleaned for reuse, while the polypropylene label is separated and discarded. The separation of these two materials can be easily accomplished by a sink/float process in which the flaked bottle and the label are suspended in water and separated on the basis of their densities. Sink/float processes are particularly efficient for the separation of PET and PP because of the large differences in the densities of these polymers. For example, the density of the water used in most recycle operations is about 1.03 to 1.05 g/cc because of the presence of contaminants, caustic (sodium hydroxide), and solids in the water. PET, with a density of around 1.35 g/cc, will sink to the bottom during recycling processing. Polypropylene, however, has a density of about 0.90 g/cc and will float to the top where it can be skimmed off. This separation method has made the recycle of PET bottles with PP labels efficient and commercially successful.

By contrast to non-shrinking PP labels, most shrink labels made from polymers such as, for example, polyester, polystyrene, and poly(vinyl chloride), have a high densities and can not be separated from other higher density polymers, such as PET, in a sink/float process. For example, the typical density is about 1.30 g/cc for polyester shrink labels, about 1.05 g/cc for polystyrene labels, and about 1.33 g/cc for PVC labels. If these labels are not removed prior to the sink/float step by some other means such as, for example, by air elutriation or by manually tearing them off of the bottle, they will sink with the PET and eventually cause color and haze contamination. For labels made from PVC, this contamination is particularly undesirable as PVC emits corrosive hydrochloric acid at PET processing temperatures. Polystyrene labels are low enough in density that most of the flakes tend to hang in the sink/float tank, and can be partially separated by filtering the water. The presence of small amounts of polystyrene with recycled PET, however, can cause offgassing and release of hazardous styrene monomer during subsequent PET processing. Polyester shrink labels, by contrast, are usually more compatible with reprocessed PET, but still present contamination problems from printing inks and glues. A polyester label that could be separated by sink/float processes, therefore, would be highly desirable for packaging applications.

One approach for improving the recycle of polyester shrink labels is to mechanically reduce their density below that of water, for example, by foaming or voiding. Foaming is effective for decreasing the density, but the resulting film is difficult to print and lacks desirable aesthetics. Void-containing films, by contrast, are easy to print and have a desirable opaque matte finish. Voids are obtained by incorporating about 5 to about 50 weight % of small organic or inorganic particles or "inclusions" (referred in the art as "voiding" or "cavitation" agents) into a polyester and orienting the polymer by stretching in at least one direction. During stretching, small cavities or voids are formed around the voiding agent. When voids are introduced into polyester films, the resulting void-containing film has a lower density than the non-voided film, becomes opaque, and develops a paper-like surface. This surface also has the advantage of increased printability; that is, the surface is capable of accepting many inks with a substantially greater capacity over a non-voided film. Typical examples of voided films are described in U.S. Pat. Nos. 3,426,754; 3,944,699; 4,138,459; 4,582,752; 4,632,869; 4,770,931; 5,176,954; 5,435,955; 5,843,578; 6,004,664; 6,287,680; 6,500,533; 6,720,085; U.S. Patent Application Publication No.'s 2001-0036545; 2003-0068453; 2003-0165671; 2003-0170427; Japan Patent Application No.'s 61-037827; 63-193822; 2004-181863; European Patent No. 0 581 970 B1, and European Patent Application No. 0 214 859 A2.

Although voided polyester films can be manufactured to have densities below 1 g/cc, these films do not normally retain these lower densities after shrinkage. Density increases of 0.05 to 0.15 g/cc are common under standard shrinkage conditions (e.g. 5 to 10 seconds in a hot air or steam shrink tunnel at 80 to 90° C.). This increase in density or "densification" results from a reduction in the size of the voids during the shrinkage of the polyester film and can continue in recycling processes, which often employ hot water for grinding or washing the polymer. For example, many recycling processes involve an initial wet or dry grinding step in which the bottles and labels are ground into smaller flakes, followed by a flake-washing step where the combined mix of ground up PET polymer and label are washed for 10 to 15 minutes in a caustic bath at 85° C. (the caustic bath typically consists of 1 to 2 wt % sodium hydroxide in water). In this flake washing process, the film/flake can continue to shrink and tends to absorb water, which further increases the density of the film by filling up some of the voids with water. This shrinkage and absorption of water can increase the density of the polyester film by as much as 0.15 to 0.30 g/cc above the initial densities of the unshrunk film and cause the polyester label material to sink with the PET bottle polymer.

One option for remedying the above problem is to increase the number of voids in the initial film to impart a lower starting density in order to compensate for shrinkage-induced densification. This remedy may be accomplished by adding more voiding agent to the film. Increasing the level of voiding agent, however, usually makes the film rough, easily teared, and unacceptably brittle. Furthermore, the increase in density upon shrinkage, generally, is proportional to the amount of voiding agent present. Thus, although the starting film density is reduced significantly with increased voiding agent, the increase in the density after shrinking and during recycling also is greater and there is little overall net benefit. Simply increasing the level of voiding agent, therefore, is not a fully satisfactory approach for most applications.

Another option is to heatset the film. Heatsetting polyesters traditionally involves heating the film at temperatures from about 180 to 200° C. after stretching while constraining the film in place. It is commonly used in PET and non-shrinking, microvoided PET films where dimensional stability is required. While this heatsetting does keep the film from increasing its density during the recycle process, it also prevents shrinking and, thus, is unacceptable for use in a shrink film.

In view of the above shortcomings, there is a need for a void-containing polyester shrink film that will simultaneously maintain a high degree of shrinkage while maintaining a low density during recycle processing. It is also desirable that this film maintain adequate smoothness, tear resistance and aesthetics. Such a film would have utility in the beverage and food packaging industry for the production of recycle-friendly, void-containing shrink labels.

SUMMARY OF THE INVENTION

We have discovered that void-containing polyester films can be prepared which exhibit high shrinkage and maintain a low density after shrinkage such as, for example, that which occurs during a plastics recycling process. Thus, the present invention provides a void-containing shrink film comprising an oriented polyester having dispersed therein about 5 to about 35 wt % of a voiding agent wherein the film has a shrinkage of at least 40% after 5 seconds in water bath at 95° C. and a density of 1.05 g/cc or less after 15 minutes in a water bath at 85° C. The void-containing film of the invention is more suitable for sink/float separation processes that are often used at the end of recycling processes and, consequently, can be recycled more easily and economically.

The void-containing, polyester shrink film of the present invention may comprise polyesters of various compositions. For example, amorphous or semicrystalline polyesters may be used which comprise at least 80 mole percent (abbreviated herein as "mole %") of the residues of one or more diacids selected from terephthalic acid, naphthalenedicarboxylic acid, 1,4-cyclohexane-dicarboxylic acid, and isophthalic acid, and about 10 to 100 mole % of the residues of one or more diols selected from 1,4-cyclohexanedimethanol, neopentyl glycol, and diethylene glycol. Additional modifying acids and diols may be used to vary the properties of the film as desired.

The film of our invention includes a voiding agent dispersed therein that comprises at least one polymer, at least one inorganic compound, or a combination thereof. Typical polymers that may be used include, but are not limited to, cellulosic polymers, starch, esterified starch, polyketones, polyester, polyamides, polysulfones, polyimides, polycarbonates, olefinic polymers, and copolymers thereof. In another aspect of the invention, the voiding agent may comprise at least one inorganic compound selected from the group consisting of talc, silicon dioxide, titanium dioxide, calcium carbonate, barium sulfate, kaolin, wollastonite, and mica. In yet another embodiment, the shrink film comprises a polyester comprising at least 95 mole percent of the residues of terephthalic acid; about 10 to about 40 mole percent of the residues of 1,4-cyclohexanedimethanol, about 1 to about 25 mole percent of the residues of diethylene glycol, and about 35 to about 89 mole percent of the residues ethylene glycol; and a voiding agent comprising cellulose acetate, polypropylene, and ethylene methyl acrylate copolymer. The films may be stretched in one or more directions and may comprise one or more layers.

Our invention further includes a process for making a void-containing shrink film having a shrinkage of at least 40% after 5 seconds in water bath at 95° C. and a density of 1.05 g/cc or less after 15 minutes in a water bath at 85° C., comprising: (i) mixing at least one polyester and 5 to 35 wt % of a voiding agent at a temperature at or above the Tg of said polyester to form a uniform dispersion of the voiding agent within the polyester; (ii) forming a film; (iii) orienting the film of step (ii) in one or more directions; and (iv) annealing the film from step (iii) at a temperature of about 75 to about 110° C.

The void-containing films of the present invention have high shrinkage and maintain their low density after exposure to temperatures typically present during recycling processes. The films may be used as roll-fed or traditional shrink-sleeve labels, can be printed easily, and seamed by traditional means. Our void-containing, polyester shrink film may be readily separated from mixtures of polymers and, thus, may be easily recovered and recycled from commercial waste. The recyclability of our shrink film in combination with its excellent physical properties make it particularly useful for labels and in other packaging applications.

DETAILED DESCRIPTION

We have discovered that void containing polyester films can be prepared which exhibit high shrinkage and maintain a low density after shrinkage. Thus, the present invention provides a void-containing shrink film comprising an oriented, polyester having dispersed therein about 5 to about 35 weight percent (abbreviated herein as "wt %") of a voiding agent wherein the film has a shrinkage of at least 40% after 5 seconds in water bath at 95° C. and a density of 1.05 g/cc or less after 15 minutes in a water bath at 85° C. Our film retains a low density after the shrinkage that typically occurs during a plastics recycling process. The film performs well in sink/float separations that typically occur at the end of the recycling processes and, thus, is recycle friendly. A shrinkage of 40% or more makes the film of the invention particularly useful for label applications.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "voids", "microvoids", and "microporous", as used herein, are intended to be synonymous and are well-understood by persons skilled in the art to mean tiny, discrete voids or pores contained within the polymer below the surface of the article that are intentionally created during the manufacture of the article. Similarly, the terms "voided", "microvoided", "cavitated" and "void-containing", as used herein in reference to the compositions, polymers, and shaped articles of the invention, are intended to be synonymous and mean "containing tiny, discrete voids or pores". The film of the invention includes a "voiding agent" dispersed within the polyester. The term "voiding agent", as used herein, is synonomous with the terms "voiding composition", "microvoiding agent", and "cavitation agent" and is understood to mean a substance dispersed within a polymer matrix that is useful to bring about or cause the formation voids within the polymer matrix upon orientation or stretching of the polymer matrix. The term "polymer matrix", as used herein, is synonymous with the term "matrix polymer" and refers to one or more polymers providing a continuous phase in which the voiding again may be dispersed such that the particles of the voiding agent are surrounded and contained by the continuous phase. In one embodiment of our invention, the polymer matrix is one or more polyesters. The term "film", as used herein, includes both film and sheet, and is intended to have its commonly accepted meaning in the art. The term "film" is also understood to include both single layer and multilayer films.

The void-containing shrink films comprise one or more polyesters. The term "polyester", as used herein, is intended to include "copolyesters" and is understood to mean a synthetic polymer prepared by the polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The polyesters used in the present invention typically are prepared from dicarboxylic acids and diols which react in substantially equal proportions and are incorporated into the polyester polymer as their corresponding residues. The polyesters of the present invention, therefore, contain substantially equal molar proportions of acid residues (100 mole %) and diol residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid residues out of a total of 100 mole % acid residues. Thus, there are 30 moles of isophthalic acid residues among every 100 moles of acid residues. In another example, a polyester containing 30 mole % ethylene glycol, based on the total diol residues, means the polyester contains 30 mole % ethylene glycol residues out of a total of 100 mole % diol residues. Thus, there are 30 moles of ethylene glycol residues among every 100 moles of diol residues. The preferred polyesters for shrink film are amorphous or semicrystalline polymers, or blends, with relatively low crystallinity. Preferably, the polyesters have a substantially amorphous morphology, meaning that the polyesters comprise substantially unordered regions of polymer.

The film of the present invention comprises a polyester or copolyester which comprises diacid residues comprising at least 80 mole percent, based on the total moles of diacid residues, of the residues one or more diacids selected from terephthalic acid, naphthalenedicarboxylic acid, 1,4-cyclohexanedicarboxylic acid, and isophthalic acid; and (ii) diol residues comprising about 10 to 100 mole percent, based on the total moles of diol residues, of the residues of one or more diols selected from 1,4-cyclohexanedimethanol, neopentyl glycol, and diethylene glycol; and 0 to 90 mole percent of the residues of one or more diols selected from: ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol. The 1,4-cyclohexanedimethanol (abbreviated herein as "CHDM") and 1,4-cyclohexanedicarboxylic acid (abbreviated herein as "CHDA") may be used as the pure cis, trans or mixtures of cis/trans isomers. Any of the naphthalenedicarboxylic acid isomers may be used but the 1,4-, 1,5-, 2,6-, and 2,7-isomers or mixtures of these isomers are preferred. Examples of polyalkylene glycols include polytetramethylene glycol (abbreviated herein as "PTMG") and polyethylene glycol (abbreviated herein as "PEG") having molecular weights up to about 2,000. In another example, the diol residues may comprise about 10 to about 99 mole percent of the residues of 1,4-cyclohexane-dimethanol, 0 to about 90 mole percent of residues of ethylene glycol, and about 1 to about 25 mole percent of residues of diethylene glycol. In a further example, the diacid residues may comprise at least 95 mole percent of the residues of terephthalic acid and the diol residues may comprise about 10 to about 40 mole percent of the residues of 1,4-cyclohexanedimethanol, about 1 to about 25 mole percent of the residues of diethylene glycol, and about 35 to about 89 mole percent of the residues of ethylene glycol.

The diacid residues may further comprise 0 to about 20 mole percent of one or more residues of a modifying diacid containing 4 to 40 carbon atoms if desired. For example, from 0 to about 20 mole % of other aromatic dicarboxylic acids containing 8 to about 16 carbon atoms, cycloaliphatic dicarboxylic acids containing 8 to about 16 carbon atoms, aliphatic dicarboxylic acids containing about 2 to about 16 carbon atoms or mixtures thereof may be used. Examples of modifying dicarboxylic acids include, but are not limited to, one or more acids selected from succinic acid, glutaric acid, 1,3-cyclohexanedicarboxylic, adipic acid, suberic acid, sebacic acid, azelaic acid, dimer acid, and sulfoisophthalic acid. It is understood by persons skilled in the art that the final composition can be arrived at by blending various polyester resins or by direct reactor copolymer-ization of the appropriate mixture of monomers. The latter is desirable to minimize compositional variability but economic necessities often make blending more cost effective.

Other examples of polyesters that may comprise the continuous polyester phase are those based on poly(ethylene terephthalate) containing about 15 to about 55 mole percent of 1,3- or 1,4-cyclohexanedimethanol, and from 1 to about 25 mole % of diethylene glycol and poly(ethylene terephthalate) containing about 15 to about 35 mole % of 1,3- or 1,4-cyclohexanedimethanol, and about 5 to about 15 mole % of diethylene glycol.

The polyesters generally will have inherent viscosity (I.V.) values in the range of about 0.5 dL/g to about 1.4 dL/g. Additional examples of I.V. ranges include about 0.65 dL/g to about 1.0 dL/g and about 0.65 dL/g to about 0.85 dL/g. To produce film with adequate stiffness, the polyester typically has a glass transition temperature (abbreviated herein as "Tg") of at least 50° C.

In addition, the polyester may further comprise one or more of the following: antioxidants, melt strength enhancers, branching agents (e.g., glycerol, trimellitic acid and anhydride), chain extenders, flame retardants, fillers, acid scavengers, dyes, colorants, pigments, antiblocking agents, flow enhancers, impact modifiers, antistatic agents, processing aids, mold release additives, plasticizers, slips, stabilizers, waxes, UV absorbers, optical brighteners, lubricants, pinning additives, foaming agents, antistats, nucleators, glass beads, metal spheres, ceramic beads, carbon black, crosslinked polystyrene beads, and the like. Colorants, sometimes referred to as toners, may be added to impart a desired neutral hue and/or brightness to the polyester and the void-containing film. Preferably, the polyester compositions may comprise 0 to about 10 weight percent of one or more processing aids to alter the surface properties of the composition and/or to enhance flow. Representative examples of processing aids include calcium carbonate, talc, clay, mica, zeolites, wollastonite, kaolin, diatomaceous earth, $TiO_2$, $NH_4Cl$, silica, calcium oxide, sodium sulfate, and calcium phosphate. Use of titanium dioxide and other pigments or dyes, might be included, for example, to control whiteness of the film or to make a colored film. An antistat or other coating may also be applied to one or both sides of the film. Corona and/or flame treatment is also an option although not typically necessary because of the high surface tension of the void-containing films. For certain combinations of polymers it may also be necessary to add acid scavengers and stabilizers to prevent degradation/browning of any cellulose esters which may be present as voiding agents. The presence of voids and any additives that may be used in the film also serve to block the transmission of UV light for applications with UV sensitive products.

Although it is preferred that the shrink film comprise one or more polyesters as the oriented polymer matrix, other non-limiting examples of polymers which may comprise the continuous phase of films of the invention include polylactic acid, polyamide, polycarbonates, styrenics, copolymers thereof, and blends thereof.

The polyesters of the instant invention are readily prepared from the appropriate dicarboxylic acids, esters, anhydrides, or salts, and the appropriate diol or diol mixtures using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The process is operated advantageously as a continuous process for economic reasons and to produce superior coloration of the polymer as the polyester may deteriorate in appearance if allowed to reside in a reactor at an elevated temperature for too long a duration.

The polyesters of the present invention are prepared by procedures known to persons skilled in the art. The reaction of the diol and dicarboxylic acid may be carried out using conventional polyester polymerization conditions or by melt phase processes, but those with sufficient crystallinity may be made by melt phase followed by solid phase polycondensation techniques. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

The polyester of our shrink film has a voiding agent dispersed therein. To generate voids efficiently within the polyester, it is desirable that the voiding agent have a hardness that is greater than the polyester matrix polymer at the stretch temperature of the film. Typical voiding agents which may be used with polyesters include at least one polymer selected from cellulosic polymers, starch, esterified starch, polyketones, polyester, polyamides, polysulfones, polyimides, polycarbonates, olefinic polymers, and copolymers thereof. The term "olefinic polymer", as used herein is intended to mean a polymer resulting from the addition polymerization of ethylenically unsaturated monomers such as, for example, polyethylene, polypropylene, polystyrene, poly(acrylonitrile), poly(acrylamide), acrylic polymers, poly(vinyl acetate), poly(vinyl chloride), and copolymers of these polymers. The voiding agent may also comprise one or more inorganic compounds such as, for example talc, silicon dioxide, titanium dioxide, calcium carbonate, barium sulfate, kaolin, wollastonite, and mica. The voiding agent also may comprise a combination of polymeric and inorganic materials. The shrink film forms voids on orientation or stretching at a temperature at or above the Tg of the polyester matrix. Stretching may be carried out in one or more directions at a stretch ratio of at least 1.5. The composition, thus, may be "uniaxially stretched", meaning the polyester is stretched in one direction or "biaxially stretched," meaning the polyester is stretched in two different directions.

The voiding agent typically has an average particle size of about 0.01 to about 50 µm after dispersion in the polymer matrix. This particle size range permits the voiding agent to be uniformly dispersed throughout the matrix polymer. Additional examples of average particle sizes for the first polymer of the voiding agent are about 0.01 to about 40 and about 0.1 to about 10 µm. The term "average particle size", as used herein, means the sum of the diameters of all the particles divided by the total number of particles. The average particle size of the first polymer may be measured by optical or electron microscopy using techniques known to persons skilled in the art.

Cellulosic polymers are particularly efficient voiding agents. For example, the voiding agent may be a cellulosic polymer and may comprise one or more of microcrystalline cellulose, a cellulose ester, or a cellulose ether. For the voiding agents of the instant invention, cellulosic polymers such as cellulose acetate, cellulose triacetate, cellulose acetate propionate, cellulose acetate butyrate, cellulose ethers, carboxymethyl cellulose, and the like, are useful and are more efficient at creating voids than voiding agents typically used in the art such as, for example, polypropylene, polystyrene, and the like. Preferably, the voiding agent may comprise a cellulose ester such as, for example, cellulose acetate, cellulose triacetate, cellulose acetate propionate, and cellulose acetate butyrate. Cellulosics also disperse well in the polyester and provide an opaque film with uniform hole size distribution. Cellulosics are produced in either powder or pelletized form, and either form may be used in the voiding agent of the invention. For example, our voiding agent may comprise cellulose acetate in powdered form, having an acetyl content from about 28 to 45 weight percent and a falling ball viscosity of between 0.01 and 90 seconds. Average particle sizes for these cellulosic particles tend to be of the order of 1 to 10 microns, with most being less than 5 microns.

The voiding agent of our novel film may comprise a single polymer or a combination of one or more polymers to obtain the desired voiding characteristics. For example, in one embodiment, the voiding agent may comprise at least one polymer selected from cellulose acetate, cellulose triacetate, cellulose acetate proprionate, cellulose acetate butyrate, polyethylene, polystyrene, polypropylene, ethylene vinyl acetate, ethylene vinyl alcohol copolymer, ethylene methyl acrylate copolymer, ethylene butyl acrylate copolymer, ethylene acrylic acid copolymer, ionomer, and copolymers thereof. In another example, the voiding agent may comprise cellulose acetate mixed with polypropylene and ethylene methyl acrylate copolymer.

The polymers that may be used as the voiding agent and polyester of the present invention may be prepared according to methods well-known in the art or obtained commercially. Examples of commercially available polymers which may be used in the invention include EASTAR™, EASTAPAK™, SPECTAR™, and EMBRACE™ polyesters and copolyesters available from Eastman Chemical Co.; LUCITE™ acrylics available from Dupont; TENITE™ cellulose esters available from Eastman Chemical Co.; LEXAN™ (available from GE Plastics) or MAKROLON™ (available from Bayer) polycarbonates; DELRIN™ polyacetals available from Dupont; K-RESIN™ (available from Phillips) and FINACLEAR™/FINACRYSTAL™ (available from Atofina) styrenics and styrenic copolymers; FINATHENE™ (available from Atofina) and HIFOR™/TENITE™ (available from Eastman) polyolefins; and ZYTEL™ nylons available from Dupont.

The level of voiding agent typically is present in the range of about 5 to 35 wt %, based on the total weight of the film. Although levels of voiding agent below 5 wt % may be used, the voiding of the film may be insufficient and not impart the desired density to the film. As voiding levels are increased beyond 35 wt %, the film may tear easily, and can be too rough for some label applications. At high voiding levels, the film also may become too flimsy to be handled easily. Other examples of voiding agent levels in the polyester are about 5 to about 30 weight percent, 10 to about 30 weight percent, about 15 to about 30 weight percent (wt %), about 20 to about 30 weight percent, and about 25 to about 30 wt %.

The shrink film of the invention comprises an oriented polyester. The term "oriented", as used herein, means that the polyester is stretched to impart direction or orientation in the polymer chains. The polyester, thus, may be "uniaxially stretched", meaning the polyester is stretched in one direction or "biaxially stretched," meaning the polyester has been stretched in two different directions. Typically, but not always, the two directions are substantially perpendicular. For example, in the case of a film, the two directions are in the longitudinal or machine direction ("MD") of the film (the direction in which the film is produced on a film-making machine) and the transverse direction ("TD") of the film (the direction perpendicular to the MD of the film). Biaxially stretched articles may be sequentially stretched, simultaneously stretched, or stretched by some combination of simultaneous and sequential stretching.

The shrink film of the instant invention may comprise a single layer or contain a plurality of layers in which at least one layer comprises a voiding agent. The invention, therefore, is understood to include films in which the single layered film may be incorporated as one or more layers of a multilayered structure such as, for example, a laminate or a coextrusion such as, for example, in roll-fed labels where the printed label is adhered or laminated to the void-containing substrate.

The shrink film has a shrinkage of at least 40% after 5 seconds in a water bath at 95° C. Shrinkage is measured by immersing a premeasured piece of film into a water bath for 5 seconds. The term "shrinkage", as used herein, is defined as the change in length divided by the original length (times 100%). For example, the shrink film may have a shrinkage of at least 50% after 5 seconds in a water bath at 95° C. In another example, the shrink film may have a shrinkage of at least 60% after 5 seconds in a water bath at 95° C.

The density of the void-containing film of the invention after shrinkage typically remains below about 1.05 g/cc after 15 minutes at 85° C. This density is useful because the caustic and contaminants in a recycling process wash bath typically will raise the water density slightly (to between 1 and about 1.03 g/cc). Furthermore, the film may gradually increase its density over time, such that a label at 1.05 g/cc after 15 minutes, will be less than 1.03 g/cc over a substantial fraction of the wash cycle. Thus, in another example of the film of our invention, the void-containing shrink film has a density of 1.03 g/cc or less after 15 minutes in a water bath at 85° C. Other examples of densities after shrinkage are 1.00 or less, 0.98 g/cc or less, and 0.95 g/cc or less after 15 minutes in a water bath at 85° C. Typically, the initial density of film before shrinkage (i.e. the unshrunk density) is about 0.95 grams/cubic centimeter (abbreviated herein as "g/cc") or less. Further examples of the intial densities of the void-containing film of the present invention are about 0.90 g/cc or less, about 0.85 g/cc or less, about 0.80 g/cc or less, about 0.75 g/cc or less, about 0.7 g/cc or less, about 0.6 g/cc or less, and about 0.5 g/cc or less. The initial unshrunk film density is a function of the level and density of the filler, the degree of voiding, the stretch ratio, and the stretch temperature, and may be tailored as appropriate, for example, to improve the separation of the film from the various other polymer components present within the packaging materials.

Another embodiment of the instant invention is a shrink film comprising an oriented polyester comprising at least 95 mole percent, based on the total moles of diacid residues, of the residues of terephthalic acid; and about 10 to about 40 mole percent, based on the total moles of diol residues, of the residues of 1,4-cyclohexanedimethanol, about 1 to about 25 mole percent of the residues of diethylene glycol, and about 35 to about 89 mole percent of the residues ethylene glycol; and about 5 to about 35 wt %, based on the total weight of the film, of a voiding agent comprising about 40 to about 60 weight percent cellulose acetate, about 20 to about 40 weight percent polypropylene, and about 5 to about 40 weight percent ethylene methyl acrylate copolymer. This film also maintains a shrinkage of at least 40% in a water bath at 95° C. after 5 seconds, and has a density of 1.05 g/cc or less after 15 minutes in a water bath at 85° C. As described previously, other densities and shrinkages may be exhibited, such as, for example, a shrinkage of at least 50% after 5 seconds in water bath at 95° C. In another embodiment, the shrink film has a shrinkage of at least 60% after 5 seconds at 95° C. In yet another embodiment, is the shrink film has a density of 1.03 g/cc or less after 15 minutes in a water bath at 85° C. This film can be separated in a sink/float recycling process from higher density polymers such as, for example, PET bottle polymer.

Sleeves and labels may be prepared from the void-containing shrink film of the present invention according to methods well known in the art. These sleeves and labels are useful for packaging applications such as, for example, labels for plastic bottles comprising poly(ethylene terephthalate). Our invention, therefore, provides a sleeve or roll-fed label comprising the void-containing shrink films described hereinabove. These sleeves and labels may be conveniently seamed by methods well-known in the art such as, for example, by solvent bonding, hot-melt glue, UV-curable adhesive, radio frequency sealing, heat sealing, or ultrasonic bonding. For traditional shrink sleeves involving transverse oriented film (via tentering or double bubble), the label is first printed and then seamed along one edge to make a tube. Solvent seaming can be performed using any of a number of solvents or solvent combinations known in the art such as, for example, THF, dioxylane, acetone, cyclohexanone, methylene chloride, n-methylpyrrilidone, and MEK. These solvents have solubility parameters close to that of the film and serve to dissolve the film sufficiently for welding. Other methods such as RF sealing, adhesive gluing, UV curable adhesives, and ultrasonic bonding can also be applied. The resulting seamed tube is then cut and applied over the bottle prior to shrinking in a steam, infrared or hot air type tunnel. During the application of the sleeve with certain types of sleeving equipment, it is important that the film have enough stiffness to pass over the bottle without crushing or collapsing as the sleeve tends to stick to or "grab" against the side of the bottle because of friction. The void-containing sleeves of the present invention have a coefficient of friction (COF) that typically is about 20 to 30% lower than that of the unvoided film. This lower COF helps to prevent label hanging and make sleeve application easier and is an unexpected benefit of the present invention.

For roll-fed labels, the void-containing film is traditionally oriented in the machine direction using, for example, a drafter. These labels are wrapped around the bottle and typically glued in place online. As production line speeds increase, however, faster seaming methods are needed, and UV curable, RF sealable, and hot melt adhesives are becoming more preferred over solvent seaming. For example, a hot melt polyester might be useful to seam a polyester-based void-containing film.

The void-containing shrink film may be prepared by mixing the polyester with the voiding agent, forming a film, orienting the film by stretching in one or more directions, and annealing the oriented film. Thus, another aspect of our invention is a process for a void-containing shrink film having a shrinkage of at least 40% after 5 seconds in water bath at 95° C. and a density of 1.05 g/cc or less after 15 minutes in a water bath at 85° C., comprising: (i) mixing at least one polyester and 5 to 35 wt% of a voiding agent at a temperature at or above the Tg of said polyester to form a uniform dispersion of said voiding agent within said polyester; (ii) forming a film; (iii) orienting the film of step (ii) in one or more directions; and (iv) annealing the film from step (iii) at a temperature of about 75 to about 110° C. Our inventive process includes all of the embodiments of the film, polyester, diacids, diols, modifying diacids, voiding agents, additives, and processing conditions described hereinabove. For example, in one embodiment, shrink film has a shrinkage of at least 50% after 5 seconds in water bath at 95° C. In another embodiment, the shrink film has a shrinkage of at least 60% after 5 seconds at 95° C.. In yet another embodiment, is the shrink film has a density of 1.03 g/cc or less after 15 minutes in a water bath at 85° C. In yet another example, the voiding agent comprises at least one polymer selected from the group consisting of cellulose acetate, cellulose triacetate, cellulose acetate proprionate, cellulose acetate butyrate, polyethylene, polystyrene, polypropylene, ethylene vinyl acetate, ethylene vinyl alcohol copolymer, ethylene methyl acrylate copolymer, ethylene butyl acrylate copolymer, ethylene acrylic acid copolymer, ionomer. and copolymers thereof.

The voiding agent is mixed and dispersed within the polyester matrix by methods well known to persons skilled in the art. The voiding agent and the polyester may be dry blended or melt mixed at a temperature at or above the Tg of the polyester in a single or twin screw extruder, roll mill, or in a Banbury Mixer to form a uniform dispersion of the voiding agent in the polyester. For example, the mixture may be formed by forming a melt of the polyester and mixing therein the voiding agent. The voiding agent may be in a solid, semi-solid, or molten form. It is advantageous that the voiding agent is a solid or semi-solid to allow for rapid and uniform dispersion within the polyester upon mixing. The components of the voiding agent can compounded together on a mixing device such as, for example, a twin screw extruder, planetary mixer, or Banbury mixer, or the components can be added separately during film formation. When the voiding agent is uniformly dispersed in the polyester, the formation of the sheet or film may be carried out by by methods well-known to persons skilled in the art such as, for example, extrusion, calendering, casting, drafting, tentering, or blowing. These methods initially create an unoriented or "cast" film that is subsequently stretched in at least one direction to impart orientation and to create the voids. Methods of unilaterally or bilaterally orienting sheet or film are well known in the art. Such sheet or film may also be stretched in the transverse or cross-machine direction by apparatus and methods well known in the art. In generally, stretch ratios of about 2X to about 7X are imparted in one or more directions to create uniaxially or biaxially oriented films. More typically, stretch ratios are from 4X to about 6X. The stretching can be performed, for example, using a double-bubble blown film tower, a tenter frame, or a machine direction drafter. Stretching is preferably performed at or near the glass transition temperature (Tg) of the polymer. For polyesters, for example, this range is typically Tg+5° C. (Tg+10° F.) to about Tg+33° C. (Tg+60° F.), although the range may vary slightly depending on additives. A lower stretch temperature will impart more orientation and voiding with less relaxation (and hence more shrinkage), but may increase film tearing. To balance these effects, an optimum temperature in the mid-range is often chosen. Typically, a stretch ratio of 4.5 to 5.5X may be used to optimize the shrinkage performance and improve gauge uniformity.

The stretching processes may be done in line or in subsequent operations. Subsequently, the void-containing film may be printed and used, for example, as labels on beverage or food containers. Because of the presence of voids, the density of the film is reduced and the effective surface tension of the film is increased, giving it a more paper-like texture. Accordingly, the film will readily accept most printing inks and, hence, may be considered a "synthetic paper". Our shrink film also may be used as part of a multilayer or coextruded film, or as a component of a laminated article.

The voids are formed around the voiding agent as the polyester is stretched at or near the glass transition temperature, Tg, of the polymer. Because the particles of the void-forming composition are relatively hard compared to the polyester, the polyester separates from and slides over the voiding agent as it is stretched, causing voids to be formed in the direction or directions of stretch in which the voids elongate as the polyester continues to be stretched. Thus, the final size and shape of the voids depends on the direction(s) and amount of stretching. For example, if stretching is only in one direction, voids will form at the sides of the voiding agent in the direction of stretching. Typically, the stretching operation simultaneously forms the voids and orients the polyester. The properties of the final product depend on and can be controlled by manipulating the stretching time and temperature and the type and degree of stretch.

The oriented film is annealed at a temperature of about 75 to about 110° C. These annealing conditions after stretching allow the film to simultaneously maintain high shrinkage and low density. Typically, the film may be annealed at a temperature ranging from about the wash temperature −10° C. to about the wash temperature +25° C. For example, if the wash temperature is 85° C., the annealing temperature of the film may be held from about 75° C. to about 110° C. In another example, the annealing temperature of the film may be maintained at about the wash temperature to about the wash temperature +15° C. Further examples of annealing temperature ranges are about 85 to about 110° C., about 80 to about 105° C., about 90 to about 110° C., about 90 to about 105° C., about 95 to about 105° C., about 80 to about 85° C., and about 95 to about 100° C. Generally, as annealing temperatures increase, film shrinkage decreases but has better density retention. For example, a fully heatset void-containing film will have no shrinkage, but will also undergo negligible change in density after washing. In another example, an annealing temperature set below the glass transition temperature of the polyester (i.e. about 75° C.) normally will result in high shrinkage of the void-containing film but high densification on exposure to temperatures typically found in recycling operations. Annealing at the "intermediate" temperatures described herein unexpectedly maintains the balance of shrinkage and density retention described above.

As an example of a typical procedure for preparing the void-containing polyester shink film of the instant invention, a polyester melt containing a uniformly dispersed voiding agent comprising a cellulosic polymer and an olefin is extruded through a slotted die at temperatures in the range of about 200° C. (400° F.) to about 280° C. (540° F.) and cast onto a chill roll maintained at about −1° C. (30° F.) to about 82° C. (180° F.). The film or sheet thus formed will generally have a thickness of about 5 to about 50 mils, although a more typical range is 5 to 15 mils. The film or sheet is then uniaxally or biaxially stretched in amounts ranging from about 200 to about 700% to provide an oriented film having a thickness of about 1 to about 10 mils, more typically about 1 to about 3 mils. A higher final thickness might be desirable, for example, to take advantage of the insulative properties or cushioning properties of the void-containing film. The voids created during the stretching operation can act as insulators much like the pores of a foamed film. Thus, the thickness of the film can be increased as appropriate to achieve the desired level of insulation. It is also possible to combine void-containing layers with foamed or non-voided layers in a layered or laminated structure. For example, a foamed center layer can be encapsulated by two void-containing layers to maximize density reduction and improve printing performance. After stretching, the film is then annealed at a temperature between 75° C. and 110° C. either continuously as part of the film stretching operation (e.g. in a tenter frame with a heatset zone), or offline. For example, the annealing is performed at a temperature of about 80° C. to about 105° C. In another embodiment, the annealing is performed at a temperature from 90° C. to 100° C. In yet another embodiment, the annealing performed at a temperature between 80 and 85° C. If annealed too cold, the film will have high shrinkage, but will lack the necessary density stability. If annealed too hot, it will retain its low density but will have unacceptably low shrinkage. Optionally, the tenter clips can be brought together slightly (e.g. from about 1 to about 10%) to facilitate the process and to help relax the film slightly, which better establishes the voids and reduces shrink stresses. Higher temperatures usually require shorter annealing times and are preferred for higher line speeds. Additional stretching after annealing can be performed, although not required. For example, the film my be oriented in one direction, annealed at a temperature of 75° C. or higher, and oriented a second time in one or more directions.

It is understood that the present invention also encompasses various modifications to control and improve shrink properties as well known to those skilled in the art. For example, to improve shrinkage at lower temperatures, a polyester or polyester monomer, or alternate polymer with a low softening point (e.g., diethylene glycol or butanediol) may be incorporated to lower the overall Tg of the polyester film. Soft segments based on polytetramethylene glycol, PEG, and similar monomers, may be added to flatten the shrink curve, lower the shrink onset, control the rate of shrinkage or improve tear properties. The shrink properties are dependent on the stretching conditions which may be modifed as appropriate to provide variations in properties such as, for example, controlled shrink force, shrink force ratios in each direction, controlled shrinkage, and property retention after shrinkage. The various factors that control the shrinkage properties of polyester films are discussed extensively in several journal articles such as, for example, in Shih, Polym. Eng. Sci., 34, 1121 (1994).

For example, in one embodiment of the current invention, a higher Tg polyester may be used as the oriented continuous polyester phase, for example, where Tg is greater than the flake wash temperature (approximately 85° C.). For example, the Tg of the oriented continuous polyester phase may be at least 85° C., at least 90° C., at least 95° C., and at least 100° C. In another example Eastman Eastar™ PCTG copolyester is used as the continuous oriented phase. This polyester has a Tg of 90° C. and a low density (1.24 g/cc vs. about 1.30 g/cc for standard shrink copolyesters). The lower density helps as less void formation is required. Void-containing films prepared from this polymer retain their low density after the flakewashing. Films prepared from high Tg polyester, however, may require a high onset temperature for shrinkage. With the PCTG film described above, the film will shrink to very high levels (>70%), although high shrinkage tunnel temperatures may be required. As another example, a blend of PCTG copolyester and PETG copolyester (Tg=80° C.) could be used such that the blend Tg is closer to 85° C. This Tg would allow for lower shrink tunnel temperatures than pure PCTG, but would still help with density retention during flake washing.

Other variations and combination of this can also be envisioned. For example, the same conditions apply whether the film is uniaxially oriented on a drafter or biaxially oriented as long as the film is properly annealed. It is also possible to apply a two-stage stretch where the film is oriented, then annealed at a temperature of 75° C. or more, then restretched and optionally reannealed a second time. The intermediate annealing step helps to "set" the initial voids and essentially defines an upper density threshold. A variation of this would be to orient the film in the MD with a drafter, followed by annealing at a very high temperature to eliminate shrinkage, and then normal stretching on a tenter frame. This approach would give a uniaxially shrinking film, but with the extra density reduction associated with biaxial orientation. It could be optionally annealed a second time if so desired.

EXAMPLES

General—Test methods followed standard ASTM procedures wherever possible. Film densities were obtained by immersing small pieces of the film (cut using a hole punch) in fluids of known density. The fluid density which caused the film sample to "hang" without sinking or floating was taken to be the film density. For densities from 0.80 g/cc to 1 g/cc, these fluids were produced from blends of ethanol and water and calibrated against a hydrometer. For densities above 1 g/cc, the control fluids were blended in a similar manner using salt and water.

General film quality and aesthetics were based on subjective evaluation and are shown in Table II. An excellent film was one with uniform dispersion of voids/additives, high opacity, no high/low spots, good strength, and no streaking from poor mixing. Film tactile qualities (i.e. "hand") were also included with stiff, noisy films being rated more poorly, and softer "low-noise" films being preferred. Poor films generally exhibited a combination of high noise, easy tearing, and poor surface/opacity uniformity (e.g. "streakiness").

Film shrinkage was measured by immersing a sample of known initial length into a water bath at a given temperature from 65° C. to 95° C., typically for 5 seconds, and then measuring the change in length in each direction. Shrinkage is reported as change in length divided by original length times 100%. The shrinkage at 95° C. after 5 seconds is reported as the "ultimate" shrinkage. Nominal sample size was 10 cm by 10 cm. Results reported are nominally the average of two measurements. Glass transition temperatures were determined by DSC using ASTM Method D3418.

Comparative Examples 1-7

Density Change after Recycle Processing—An amorphous copolyester comprising 100 mole percent terephthalic acid, 20 mole percent 1,4-cyclohexane-dimethanol, 71 mole percent ethylene glycol, and 9 mole percent diethylene glycol (neat density=1.30 g/cc, Tg=75° C.), was used as the matrix polyester. The voiding agent was a concentrate produced on a twin screw extruder. It contained 60 wt % of cellulose acetate ("CA") powder (CA398-30, available from Eastman Chemical Co.), 30 wt % of polypropylene (P4G3Z-039, available from Huntsman Chemical Co., 5 melt index), and 10 wt % of ethylene methyl acrylate copolymer (EMAC 2260, available from Eastman Chemical Co.). The compounded products were pelletized for ease of handling. All samples (matrix and voiding agent) were dried at 54.4° C. (130° F.) for 8 hours prior to extrusion.

The voiding agent concentrate was pellet/pellet blended with the matrix polyester and mixed using a 2.5 inch single screw extruder having an L/D=30:1, at a nominal processing temperature of 260° C. The melt was then forced through a coathanger type film die and cast onto a chill roll at 55° C. The cast film thickness was 250 microns. Blend levels were 20, 25 and 30 wt % of concentrate and a roll of film made for each. Densities of this unstretched film were about 1.24 to 1.26 g/cc depending on the level of voiding agent concentrate.

Stretching of the cast film rolls was performed on a commercial tenter frame. The stretching conditions, including stretch ratio, preheat temperature (zone 1), stretch temperature (zone 2) and anneal temperature (zone 3) varied from sample to sample. Linespeeds were nominally 40 to 50 feet per minute ("fpm"). The annealing section of the tenter was also retracted partially for some of the samples to help reduce shrink force. This retraction is expressed as a percentage of the maximum stretched web width.

Shrinkage properties were measured at 95° C. after 5 seconds. All films had very low machine direction (MD) shrinkage (<5%) over the full temperature range. Density prior to shrinkage was also measured and all values are listed in Table I.

To simulate the recycle flake wash process, samples of film were placed in a hot water bath at 85° C. for 15 minutes. After removal, the film was towel dried, and the density remeasured (see Table I) It is preferred that the films still maintain a density less than 1.05 g/cc (preferably<1.00g/cc) so as to ensure flotation. However, as observed from the data, the long term shrinkage of the film, coupled with water absorption acted to increase the density significantly.

All of the Comparative Examples suffered from either excessive densities after washing, or insufficient shrinkage. Comparative Example 1 is typical of the stretch conditions that one would normally use to make such a film. Void-containing films like Comparative Example 1 that had very high shrinkage, were often found to lose some of their opacity during flakewash because the voids closed up over time. To retard the loss of opacity, the annealing temperature may be increased. As observed with Comparative Examples 2 and 3, higher annealing temperatures helped to retain the postwash density, however ultimate shrinkage became too low. Another option is to increase the level of concentrate to create more voids. While this lowers the initial film density, it was observed that the increase in density after hot washing was exacerbated, thereby offsetting some of the gains from a lower initial density.

TABLE I

Data for Comparative Examples 1-7

| Comparative Example # | 1 | 2 | 3 | 4 | 5 | 6 | 7 |
|---|---|---|---|---|---|---|---|
| % Concentrate | 20% | 20% | 20% | 25% | 25% | 25% | 25% |
| Stretch Ratio | 5.75 | 5.75 | 5.75 | 4.8 | 5.2 | 5.2 | 5.2 |
| Temp. preheat ° C. | 88 | 88 | 88 | 90 | 90 | 88 | 88 |
| Temp. stretch ° C. | 80 | 80 | 80 | 90 | 90 | 88 | 88 |
| Temp anneal ° C. | 88 | 116 | 127 | 96 | 93 | 91 | 107 |
| Clip Retraction (%) | 0 | 0 | 0 | 5 | 0 | 0 | 0 |
| Thickness (mils) | 2.4 | 2.4 | 2.4 | 2.9 | 3.0 | 3.0 | 3.0 |
| Density before shrinkage, g/cc | 0.93 | 0.93 | 0.93 | 0.91 | 0.89 | 0.83 | 0.85 |
| Density after shrinkage (15 min@85° C.), g/cc | 1.12 | 1.03 | 1.01 | 1.08 | 1.07 | 1.07 | 1.01 |
| % Shrinkage after 5 seconds@95° C. | 66 | 25 | 17 | 49 | 52 | 58 | 39 |

Examples 1-8

Annealing Experiments—Films in this example were made in the same manner as Comparative Examples 1-7; however, stretching conditions were varied to try and balance the post-wash density with shrinkage. It was found that annealing temperatures in the vicinity 100° C. worked best. Samples containing lower levels of concentrate (e.g., Examples 1 and 2) had the narrowest processing window, but were also the toughest and least likely to tear. Stretch ratios had to be run higher on these films to get the most possible voiding (they were also less likely to tear during the stretching process than films with higher levels of concentrate).

Increasing the level of concentrate to 30% (Examples 6-8) resulted in a film with excellent shrinkage and low density under a very wide range of processing conditions. However, the film was also more prone to tearing because of the high level of voiding. Although this film would be acceptable for many applications, it is less preferred for packaging labels and slightly lower concentrate levels would be more desirable. By contrast, films with about 25% loading of voiding agent had acceptable tear properties with a reasonably wide, processing window.

the average of preheat and stretch temperature), % clip retraction, anneal temperature, and % concentrate. The responses to be predicted were 5 seconds shrink at 95° C. and density after 15 minutes at 85° C. Analysis and optimization was performed using JMP™ statistical analysis software and a linear model fit.

Optimization was performed in order to find the best combination of conditions that would yield high shrinkage (>60%) and a density less than 1.05 g/cc after the 85° C. wash. Constraints to the optimization were that the concentrate level had to be less than 30 wt % to minimize brittleness, and the stretch conditions had to be within "reasonable" bounds for a commercial line.

From the model results, it was found that the shrinkage and post-wash density targets could be hit simultaneously if the concentrate level was kept above 25 wt %, and the anneal temperature was maintained between about 75 and 90° C. This result assumes a 5X stretch ratio, an 85° C. stretch temperature, and 0% clip retraction, all of which are "typical" run conditions. As the anneal temperature was decreased, the level of concentrate needed to maintain the low post-recycle density increased, such that at 75° C. anneal temperature, the concentrate level needed was 30 wt %.

TABLE II

Data for Examples 1-8

| Sample # | 1 | 2 | 3 | 4 | 5 | 6 | 7 | 8 |
|---|---|---|---|---|---|---|---|---|
| % Concentrate | 20% | 20% | 25% | 25% | 25% | 30% | 30% | 30% |
| Stretch Ratio | 5.75 | 5.75 | 5.2 | 5.2 | 5.2 | 5.2 | 5.2 | 5.2 |
| Temp. preheat ° C. | 88 | 88 | 90 | 88 | 88 | 88 | 82 | 80 |
| Temp. stretch ° C. | 80 | 77 | 90 | 88 | 88 | 88 | 82 | 80 |
| Temp anneal ° C. | 104 | 100 | 96 | 96 | 99 | 102 | 96 | 94 |
| Clip Retraction (%) | 0 | 3.4 | 0 | 0 | 0 | 0 | 0 | 0 |
| Thickness (mils) | 2.6 | 2.6 | 3.0 | 3.0 | 3.0 | 3.6 | 3.4 | 3.4 |
| Density before shrinkage, g/cc | 0.93 | 0.93 | 0.93 | 0.85 | 0.85 | 0.8 | 0.79 | 0.8 |
| Density after shrinkage (15 min@85° C.), g/cc | 1.05 | 1.04 | 1.05 | 1.05 | 1.01 | 0.98 | 0.95 | 1.01 |
| % Shrinkage after 5 seconds@95° C. | 40 | 59 | 52 | 55 | 50 | 44 | 57 | 62 |

Example 9

Curve Fitting and Optimization of Trial Data—The data from Examples 1-8 and Comparative Examples 1-7 were statistically fit to an equation to better understand trends and interactions (included in this analysis was other trial data on the same tenter frame not reported above). The variables in the model were stretch ratio, average stretch temperature (i.e.

An optimal, more "robust" region of operation taking into consideration a balance of all of the key properties (including toughness and film cost), was in the region of 27 to 30 wt % concentrate, and an anneal temperature of 75 to 85° C. Here the film had high shrinkage (>60%), low post-recycle density (<1.05 g/cc after 15 minutes at 85° C.) and good overall aesthetics and properties.

Thus as a prophetic example, a film is prepared as described in Examples 1-8, using 28 wt % of the concentrate in the copolyester. The film is stretched at 85° C. using a 5X stretch ratio. Annealing is performed between 80 and 85° C. with only a small amount of clip retraction (0 to 5%). The film meets the criteria of very high shrinkage while maintaining recyclability and toughness.

Example 10 and 11

Sequential Biaxial Stretching with Intermediate Annealing—Films in this example were made using the same copolyester as above, and with 25 wt % of voiding agent concentrate; however, film stretching was performed on a T. M. Long laboratory film stretcher. The film stretcher was setup in a manner to simulate an MD stretch, anneal, then a transverse (TD) stretch operation.

A 2 inch square piece of 10 mil film was placed in the film stretcher and preheated to 85C. The film was then stretched 2X in the MD only. After stretching, the film was allowed to set in the 85° C. oven for 1 minute to anneal the film and relax the orientation. After this anneal step, the film was stretched in the TD to 5X. This sample is denoted as Example 10. This process was then repeated for Example 11 except the first MD stretch was 3X instead of 2X.

Film densities for both of these films were extremely low (<0.80 g/cc) as the biaxially stretching helps to open up the voids to a greater extent. Shrinkages in the 5X stretch direction were both nominally 65% after 5 seconds at 95° C. Both samples did exhibit some "off-axis" shrinkage at 95° C. (25% for Example 10 and 35% for Example 11); however, this could easily be eliminated with longer annealing time or hotter annealing temperatures (a different anneal temperature was not possible with the T. M. Long).

The densities after 15 minutes at 85° C. were 1.01 and 0.90 g/cc respectively for Examples 10 and 11. Thus the sequential stretching with annealing helped to make the shrink film maintain a very low density, even after recycle. This would allow one to use less voiding concentrate and still maintain recycle and shrinkage properties, if so desired. It is further noted that a second anneal step could be applied after the $2^{nd}$ stretch, but it was not needed since the post-recycle densities were already well below 1.05 g/cc.

Example 12

In this prophetic example, the copolyester described above is combined with 25 wt % of the voiding agent and cast into a 30 mil film using a chill roll. This film is then stretched about 3X on an MDO drafter and annealed at about 120° C. or higher (using the annealing rolls of the drafter). The voiding agent also acts as an antiblock and prevents sticking to the rolls at this higher temperature. The choice of 3X (or higher) helps to ensure that no gauge bands occur due to stretching variations in the film.

After drafting and annealing (first annealing), the film is passed to the tenter frame where it now has a thickness of 10 mils (after the 3X draft). It is preheated and stretched 5X at 85° C. with 5% clip retraction. The film is optionally annealed a second time at about 80° C. After this second stretch, the thickness is nominally 2 mils, the density of the film is less than 0.80 g/cc and the main shrinkage (5X stretch or TD direction) is 60% or higher after 5 seconds at 95° C. The annealing after the drafting reduces the in-line or MD shrinkage to less than 10% (5 seconds at 95° C.). The resulting film is cheaper and has better properties than a comparable film stretched only in one direction. Furthermore, the combination of drafting and tentering allows for greater throughputs and better economics on the overall process.

What is claimed is:

1. A process for making a void-containing shrink film, the process comprising steps of:
   (i) mixing a copolyester and 20 to 30 weight percent of a voiding agent based on a total weight of the copolyester and voiding agent at a temperature at or above the glass transition temperature of the copolyester so as to form a uniform dispersion of the voiding agent within the copolyester;
   (ii) forming a film from the dispersion;
   (iii) orienting the film in one or more directions at a temperature above the glass transition temperature of the copolyester; and
   (iv) annealing the oriented film at a temperature above the orienting temperature and from about 85° C. to about 110° C.,
   wherein after 5 seconds in a 95° C. water bath the annealed film has a shrinkage of at least 40%, and
   wherein after 15 minutes in a 85° C. water bath the annealed film has a density of less than 1.05 g/cc so as to float in a recycling process wash bath having a density of about 1.03-1.05 g/cc.

2. The process of claim 1, wherein said forming step (ii) is by extrusion, calendaring, casting, or blowing.

3. The process of claim 1, wherein the copolyester comprises (i) at least 80 mole percent of the residues of one or more diacids selected from terephthalic acid, naphthalenedicarboxylic acid, 1,4-cyclohexane-dicarboxylic acid, and isophthalic acid, (ii) about 10-100 mole percent of the residues of one or more diols selected from 1,4-cyclohexanedimethanol, neopentyl glycol, and diethylene glycol, and (iii) 0-90 mole percent of the residues of one or more diols selected from ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol.

4. The process of claim 3, wherein the diol residues comprise about 10 to about 99 mole percent of the residues of 1,4-cyclohexane-dimethanol, 0 to about 90 mole percent of residues of ethylene glycol, and about 1 to about 25 mole percent of residues of diethylene glycol.

5. The process of claim 3, wherein the diacid residues further comprise 0 to about 20 mole percent of one or more residues of a modifying diacid containing 4 to 40 carbon atoms.

6. The process of claim 5, wherein the modifying diacid is selected from succinic acid, glutaric acid, adipic acid, suberic acid, sebacic acid, azelaic acid, dimer acid, and sulfoisophthalic acid.

7. The process of claim 1, wherein the copolyester further comprises one or more additives selected from the group consisting of antioxidants, melt strength enhancers, branching agents, chain extenders, flame retardants, fillers, dyes, colorants, pigments, nanoclays, antiblocking agents, flow enhancers, impact modifiers, antistatic agents, processing aids, mold release additives, and plasticizers.

8. The process of claim 1, wherein the voiding agent comprises least one inorganic compound selected from the group consisting of talc, silicon dioxide, titanium dioxide, calcium carbonate, barium sulfate, kaolin, wollastonite, and mica.

9. The process of claim 1, wherein the voiding agent comprises at least one polymer selected from the group consisting of: cellulosic polymers, starch, esterified starch, polyketones, polyester, polyamides, polysulfones, polyimides, polycarbonates, olefinic polymers, and copolymers thereof.

10. The process of claim 1, wherein the voiding agent comprises at least one polymer selected from the group consisting of cellulose acetate, cellulose triacetate, cellulose acetate proprionate, cellulose acetate butyrate, polyethylene, polystyrene, polypropylene, ethylene vinyl acetate, ethylene vinyl alcohol copolymer, ethylene methyl acrylate copolymer, ethylene butyl acrylate copolymer, ethylene acrylic acid copolymer, ionomer, and copolymers thereof.

11. The process of claim 1, wherein the voiding agent comprises about 40 to about 60 weight percent cellulose acetate, about 20 to about 40 weight percent polypropylene, and about 5 to about 40 weight percent ethylene methyl acrylate copolymer.

12. The process of claim 1, wherein the annealed film is a roll fed label or a shrink sleeve.

13. The process of claim 1, wherein the annealed film has a shrinkage of at least 50% after 5 seconds in the 95° C. water bath.

14. The process of claim 13, wherein the annealed film has a density of 1.03 g/cc or less after 15 minutes in the 85° C. water bath.

15. The process of claim 1, wherein the shrink film comprises a plurality of layers in which at least one layer comprises the voiding agent.

16. The process of claim 1, wherein said orienting step (iii) is conducted in one direction before said annealing step (iv), and wherein the annealed film is oriented a second time after said annealing step (iv) in one or more directions.

17. The process of claim 1, wherein said annealing step (iv) is conducted at a temperature of about 85° C. to about 105° C.

18. The process of claim 1, wherein said annealing step (iv) is conducted at a temperature of about 80° C. to about 85° C.

19. The process of claim 1, wherein said annealing step (iv) is conducted at a temperature of about 95° C. to about 100° C.

* * * * *